(12) United States Patent
Zloczower et al.

(10) Patent No.: US 12,345,504 B2
(45) Date of Patent: Jul. 1, 2025

(54) DUAL BAND GUN-SIGHT CALIBRATOR

(71) Applicants: Leon Zloczower, Ness Ziona (IL); Ami Mesilati, Rechovot (IL)

(72) Inventors: Leon Zloczower, Ness Ziona (IL); Ami Mesilati, Rechovot (IL)

( * ) Notice: Subject to any disclaimer, the term of this patent is extended or adjusted under 35 U.S.C. 154(b) by 134 days.

(21) Appl. No.: 18/220,850

(22) Filed: Jul. 12, 2023

(65) Prior Publication Data
US 2024/0019228 A1    Jan. 18, 2024

Related U.S. Application Data

(60) Provisional application No. 63/389,951, filed on Jul. 18, 2022.

(51) Int. Cl.
*F41G 1/54*    (2006.01)
*G02B 7/04*    (2021.01)

(52) U.S. Cl.
CPC .............. *F41G 1/545* (2013.01); *G02B 7/04* (2013.01)

(58) Field of Classification Search
CPC .................................. F41G 1/545; G02B 7/04
USPC ........................................................ 42/134
See application file for complete search history.

(56) References Cited

U.S. PATENT DOCUMENTS

| | | | |
|---|---|---|---|
| 5,440,134 A | 8/1995 | Lough et al. | |
| 8,228,591 B1* | 7/2012 | Towers | G01S 17/04 |
| | | | 359/275 |
| 9,303,952 B2* | 4/2016 | H?kansson | G02B 23/105 |
| 9,897,415 B2* | 2/2018 | Zhang | G02B 27/32 |
| 2005/0052755 A1* | 3/2005 | Lawson | G02B 3/10 |
| | | | 359/722 |
| 2006/0164718 A1* | 7/2006 | Tai | G02B 23/12 |
| | | | 359/353 |
| 2007/0035824 A1 | 2/2007 | Scholz | |
| 2010/0277912 A1 | 11/2010 | Francis | |
| 2011/0051229 A1* | 3/2011 | Alexay | G02B 13/146 |
| | | | 359/356 |
| 2016/0028970 A1 | 1/2016 | Masarik | |
| 2017/0059830 A1* | 3/2017 | Spencer | G02B 26/001 |
| 2017/0321993 A1* | 11/2017 | Crispin | G02B 23/14 |
| 2020/0053303 A1 | 2/2020 | Vaklev | |
| 2024/0019228 A1* | 1/2024 | Zloczower | G02B 7/04 |

FOREIGN PATENT DOCUMENTS

| | | |
|---|---|---|
| GB | 2149141 A | 6/1985 |
| GB | 2391924 A | 2/2004 |

* cited by examiner

*Primary Examiner* — Samir Abdosh

(57) ABSTRACT

The present invention relates to a sight dry zeroing assembly and, more particularly, but not exclusively, to a gun-sight dry zeroing assembly which is suitable for dry zeroing of both daylight gun-sights and thermal gun-sights.

19 Claims, 10 Drawing Sheets

DUAL BAND GUN-SIGHT CALIBRATOR

FIELD OF THE INVENTION

The present invention, in some embodiments, thereof relates to a sight dry zeroing assembly and, more particularly, but not exclusively, to a multi-purpose gun-sight dry zeroing assembly.

BACKGROUND OF THE INVENTION

Gun-sights include optical gun-sights which are suitable for daylight use, and thermal gun-sights suitable for use in darkness or low light conditions. Optical gun-sights, such as, but not limited to, iron gun-sights, telescopic, day and night gun-sights and reflex gun-sights are characterized in that the user aligns the gun's barrel with the target by viewing the target through the optical gun-sight.

Gun-sight zeroing approaches can be broken into live gun-sight zeroing and gun-sight dry zeroing. Live gun-sight zeroing involves actual firing and correction of offsets by adjustments made in the position of the gun-sight with respect to the gun's barrel. Live gun-sight zeroing is considered limiting because it requires (i) a firing zone; and (ii) light conditions which match the properties of the gun-sight being zeroed. Thus, day operated gun-sights cannot be zeroed during night time and vice-versa.

Dry zeroing facilitates calibration of the sight without actual firing of the weapon. and ensures that the point of aim and the point of impact is the same for a given range.

Several systems for gun-bore sighting under various light conditions are known, e.g., U.S. Pat. No. 10,003,756B2 appears to disclose, "A sight system is provided that includes an optical mode providing an optical image of a field of view and a video display mode providing video of the field of view acquired by an image sensor. The sight system can include optical components configured to present the field of view to the image sensor and to present substantially the field of view to a user through an eyepiece coupled to the sight system. The sight system can include a display configured to display to the user, through the eyepiece, video of the field of view acquired by the image sensor. The sight system can include a user interface feature configured to change from the optical mode to the video display mode when actuated by the user. Thus, the sight system can be configured to provide bore-sighted optical and video data to the user."

U.S. Pat. No. 10,742,913 appears to disclose, "An imaging system includes a focal plane array including an array of pixels. An isothermal diaphragm covers a first portion of the pixels along a periphery of the array and exposing an imaging portion of the pixels. A controller is operatively connected to the focal plane array to read sensor data from the focal plane array, wherein the sensor data includes image data from the imaging portion of the pixels and non-uniformity data from the first portion of the pixels. The controller is operatively connected to the focal plane array to enhance the image data based on the non-uniformity data."

British Patent Application GB2149141 appears to disclose, "Day and night sighting apparatus 1 comprising a day sighting apparatus, consisting of a periscope 2 and a aiming head 4, as well as with a thermal-imager 10, a cathode-ray tube 13 for reproducing the thermal image converted into visible frequencies. The necessary axis harmonisation of the day sighting apparatus and the thermal imager of known like apparatus is abolished in that in the apparatus 1 a reticle 16 is generated electronically and is displayed on screen 14 of the cathode-ray tube 13. Thus, the reticle 16 can be used not only in an eyepiece 3, but also by a coupled-up automatic target detection or tracking apparatus."

U.S. Pat. No. 7,319,557 appears to disclose, "A fused thermal and a direct view aiming sight includes an optical gun sight, a thermal sight, and a beam combiner. The optical sight generates a direct view image of an aiming point or reticle superimposed on a target scene. The thermal sight generates a monochromic thermal image of the target scene. The combiner is positioned behind a 1× non-magnified optical sight and the thermal sight and in front of an exit pupil of the thermal sight. The combiner is positioned right behind the intermediate image plane of a magnified optical sight between an objective lens and an eyepiece. The combiner passes the direct view image and reflects the thermal image to the exit pupil to fuse the thermal image onto the direct view image for an operator to see at the exit pupil as a combined thermal and direct view optical image of the target scene together with the aiming reticle."

U.S. Pat. No. 7,911,687B2 appears to disclose, "A sighted device has a sight that includes an objective lens lying on an optical axis of the sight so that an input beam is coincident with the optical axis, an eyepiece lens lying on the optical axis, an imaging detector having a detector output signal, a signal processor that receives the detector output signal from the imaging detector, modifies the detector output signal, and has a processor output signal, and a video display projector that receives the processor output signal and has a video display projector output. An optical beam splitter lies on the optical axis. The beam splitter allows a first split subbeam of the input beam to pass to the eyepiece lens and reflects a second split subbeam of the input beam to the imaging detector. An optical mixer mixes the first split subbeam and the video display projector output prior to the first split subbeam passing through the eyepiece lens."

U.S. Pat. No. 4,572,625 appears to disclose, "An optical system for a periscope-like sighting device is proposed for the localization, tracking and measurement of a target and comprises a plurality of optical elements as well as a laser range-finder essentially comprising transmitter and receiver portions. In this optical system, the visible and invisible radiation mutually parallelly incident upon a main mirror rotatable about a first axis and pivotable about a second axis is reflected to a first deflection prism. The first deflection prism deflects the radiation at substantially right angles through an objective lens to a first beam-splitter. The first beam-splitter deflects the invisible laser radiation to the receiver portion and transmits the visible radiation to a second beam-splitter and thence to a second deflection prism and an ocular. For achieving a view of the field of observation or a tracking of the target, or both, a television camera can be arranged on the side of the housing of the sighting device."

U.S. Pat. No. 10,060,702 appears to disclose, "A system for aiming a projectile weapon includes a telescopic sight for use with a second sighting device, such as a reflex sight or other non-magnifying sight. The telescopic sight has an eye point spaced apart rearwardly from its eyepiece and positioned at a vertical plane containing a line of initial trajectory of the weapon to which the aiming system is mounted so that a line parallel to the line of initial trajectory does not intersect the eyepiece. The location of the eye point facilitates concurrent use of a second sighting device at a normal mounting height and viewable past the eyepiece, thereby allowing the viewer to change views between the telescopic sight and the second sighting device with little eye movement and essentially no head movement."

SUMMARY OF THE INVENTION

According to an aspect of some embodiments of the invention, there is provided a zeroing assembly for a gun-sight including: a zeroing target; and a dual band focusing assembly, wherein the dual band focusing assembly includes a lens and a switching mechanism configured to reversibly switch the focusing assembly from a first sighting configuration to a second sighting configuration.

According to some embodiments of the invention, the first configuration focuses visible light coming from the zeroing target through the gun-sight and the second configuration focuses infrared light coming from the zeroing target through the gun-sight.

According to some embodiments of the invention, the zeroing target includes a reticle.

According to some embodiments of the invention, the reticle is made of a material that is opaque to visible light and a good conductor.

According to some embodiments of the invention, the reticle is made of metal.

According to some embodiments of the invention, the reticle includes at least one of a grid and coordinates engraved thereon.

According to some embodiments of the invention, the lens is composed of a material that is transparent both to visible light and to infrared light.

According to some embodiments of the invention, the lens is composed of Zinc Selenide.

According to some embodiments of the invention, the first sighting configuration is an optical sighting configuration.

According to some embodiments of the invention, the zeroing assembly further includes a visible light illumination source located between the zeroing target and the dual band focusing assembly.

According to some embodiments of the invention, the illumination source is controlled by a controller.

According to some embodiments of the invention, the second sighting configuration is a thermal sighting configuration.

According to some embodiments of the invention, the zeroing assembly further includes at least one thermistor.

According to some embodiments of the invention, the zeroing assembly further includes a thermal cooler.

According to some embodiments of the invention, the thermal cooler includes a thermoelectric cooler (TEC).

According to some embodiments of the invention, the thermal cooler cools a portion of the target.

According to some embodiments of the invention, a thermal cooler cools the reticle.

According to some embodiments of the invention, the zeroing assembly further includes a controller, wherein the controller is configured to activate or deactivate at least one thermal cooler based on a signal from at least one thermistor.

According to an aspect of some embodiments of the invention, there is provided a method for changing a band of an optical system for dual band bore sighting, the method including: providing a focusing assembly in a first configuration for use in a first band, the focusing assembly in the first configuration focusing light in a first band from a target onto a gun sight; and; reversibly switching the focusing assembly from the first configuration to a second configuration wherein the focusing assembly focuses light in a second band from the target onto the gun sight.

According to some embodiments of the invention, the optical system includes a dual band lens and wherein the reversible switching includes moving the dual band lens from a first position in a to a second position along an optical axis of the optical system.

According to some embodiments of the invention, the first position and the second position are predetermined.

According to some embodiments of the invention, the method where the optical system further includes a switching mechanism, and the switching includes reversibly toggling the switching system between two predetermined states.

According to some embodiments of the invention, the first configuration is an optical sighting configuration.

According to some embodiments of the invention, the second configuration is a thermal sighting configuration.

According to some embodiments of the invention, in the first configuration a first illuminations source in the first band is designated and further including a controller designating a second illumination source in the second band.

According to some embodiments of the invention, the controller is configured to synchronize the switching to designating of an illumination source.

According to some embodiments of the invention, the system includes a first illumination source in the first band and a second illumination source in the second band and further including the controller designating the second illumination source in response to the switching.

According to some embodiments of the invention, the controller is configured to activate or at least one thermal cooler in response to the switching.

According to some embodiments of the invention, when the system is in the second configuration, the controller is configured to activate a thermal cooler in response to a signal from at least one thermistor.

According to some embodiments of the invention, for optical sighting a visible source is designated, and a thermal cooler is deactivated.

According to some embodiments of the invention, for thermal sighting, a visible illumination source is deactivated, and a thermal cooler is activated.

DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Overview

Figure 1:
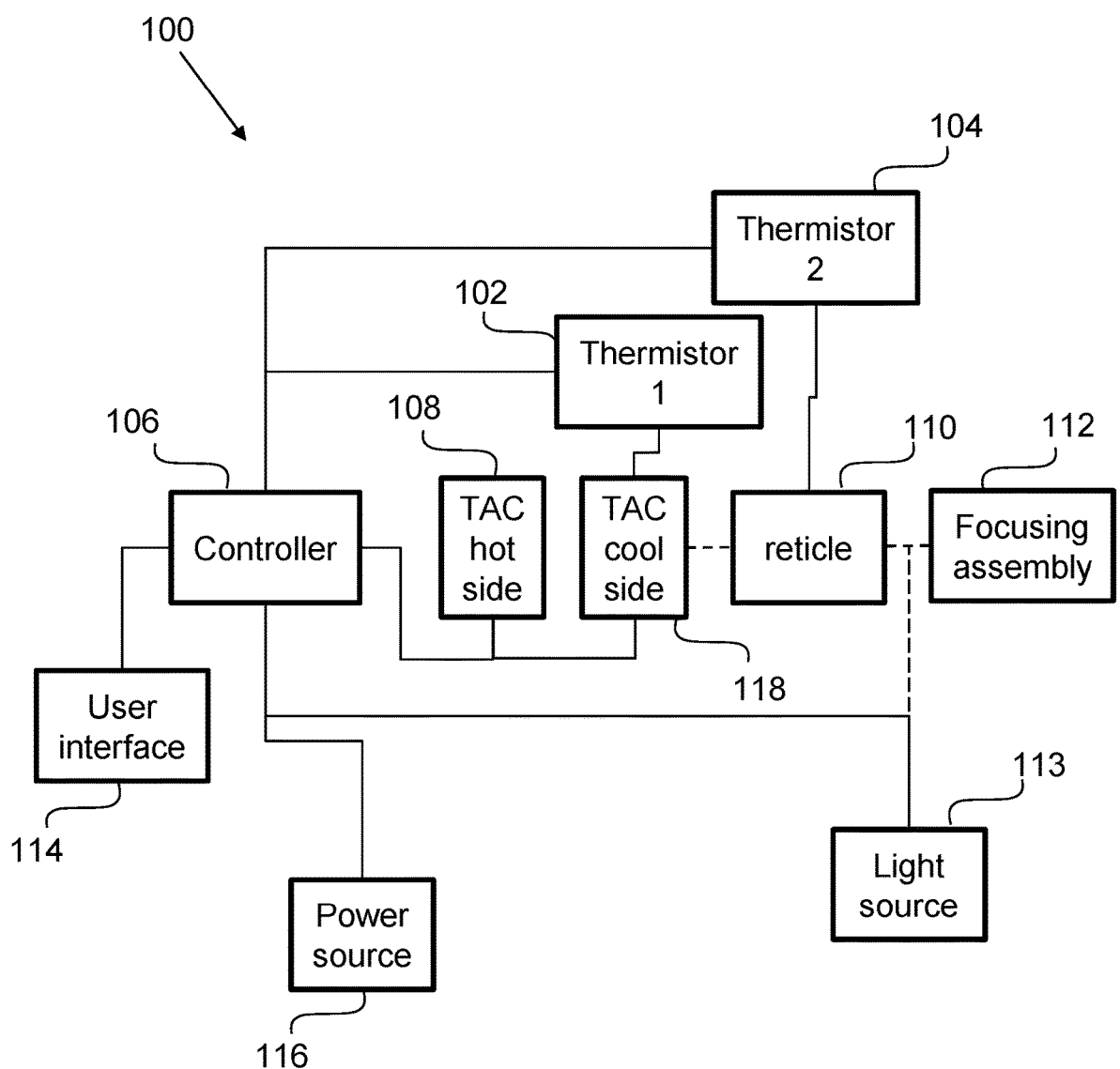
FIG. 1 is a schematic view of a system in accordance with an embodiment of the current invention.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

The present invention in some embodiments, thereof relates to a sight dry zeroing assembly (e.g., a bore sighting assembly) and, more particularly, but not exclusively, to a gun-sight dry zeroing assembly which is suitable for dry zeroing of gun-sights in multiple light bands. For example, a visible light sight and low light gun-sights. For example, the an infrared and/or thermal sight and a visible light sight.

A gun-sight assembly may be used for many devices including weapons such as small arms, an infantry weapon, a rifle, an assault rifle etc. For the sake of the following disclosure unless specifically stated otherwise, the term "gun-sight" may refer to a sight for any weapon and/or of another device.

According to some embodiments, the gun-sight assembly may include a dual band focusing assembly. Optionally, the dual band focusing assembly may include one or more lenses. Optionally, the dual band focusing assembly may include two or more configurations. Optionally, the dual band focusing assembly may include a toggle mechanism (e.g., a switchover mechanism) to facilitate reversibly switching the system between two or more configurations. Optionally, the dual band focusing assembly may include an optical gun-sight configuration. Optionally, the dual band focusing assembly may include a thermal gun-sight configuration. For example, the toggle mechanism may facilitate switching between a first configuration, such as an optical gun-sight configuration, and a second configuration, such as a thermal gun-sight configuration, and vice versa.

In some embodiments, the system will include a dual band lens. For example, the dual band lens may be transparent (e.g., greater that 50% transmission and/or greater that 70% transmission and/or greater than 80% transmission in both the visible spectrum (for example, from 400 to 800 nm and/or from 400 to 500 nm and/or from 500 to 600 nm and/or from 600 to 700 nm and/or from 700 to 800 nm) and the Infrared (IR) spectrum (from 800 nm to 3200 nm and/or from 800 to 1200 nm and/or from 120 to 1600 nm and/or from 1600 to 2000 nm and/or from 2000 to 2400 nm and/or from 2400 to 2800 nm and/or from 2800 to 3200 nm and/or from 3200 to 5000 nm and/or from 5000 to 10000 nm). Optionally, the position of the lens along the optical axis is changed. For example, the lens may be changed between a first predetermined position which focuses visible light from the target to the gunsight and a second position that focusses infrared light. Alternatively or additionally, a lens may be added, removed or switched when switching between bands. For example, one lens may focus light from the target to the sight in visible spectrum and a second lens may focus light from the target to the sight in the infrared spectrum. Optionally, a first lens transparent to visible light may be placed in the optical path of the device when the device is in use with visible light (a first configuration). In some embodiments, the first lens may be taken out of the optical pathway in a second configuration. Optionally, a second lens transparent to infrared light may be placed in the optical path of the device when the device is in use with infrared light (a second configuration). In some embodiments, when the system is in the first configuration the second lens may be removed and/or taken out of the optical pathway.

In some embodiments, the system may include a dual band target (e.g., a background, an illumination source and/or a reticle). For example, the background and/or reticle may have markings that are discernable under reflected visible illumination and/or are configured to be heated or cooled to become visible in the infrared band. For example, the background and/or reticle may be made of metal (and/or another material highly conductive to heat and/or have features engraved therein.

In some embodiments, a system may include multiple illumination systems. For example, there may be a visible light source, e.g., to illuminated a background and/or a reticle in the visible spectrum. For example, there may be an infrared illumination system. For example, the infrared illumination system may include a heater and/or a cooling system (e.g., a Thermal cooling device (a TAC) which may include a Thermal Electric cooler (a TEC)).

In some embodiments the various systems may be integrated and/or synchronized. For example, when working in the visible spectrum, the focusing system may be put into a visible spectrum configuration and/or a visible light illumination system may be activated and/or designated. For example, when working in the infrared spectrum, the focusing system may be put into an infrared configuration and/or an infrared illumination system may be activated and/or designated.

In some embodiments, a zeroing target may include a reticle, a grid, etc. that may be configured for viewing in both the thermal and visible spectrums. In some embodiments, the reticle may be positioned in front of a thermal cooler. Optionally, the cooler may be controlled by a controller, e.g., an electronic circuit board (CPU). In some embodiments, the zeroing target may include two or more temperature sensors. Optionally, the temperature sensors may be positioned on one or more areas of the zeroing target and/or may measure and/or update the temperature values. In some embodiments, the CPU in the electronic board may facilitate preserving a sufficient temperature difference between the reticle and the background in order that the zeroing target will be visible through the thermal gun-sight, e.g., by use of one or more thermal coolers (TAC).

In some embodiments, the lens may be made from, but is not limited to, ZiSe (Zinc Selenide). In some embodiments, the zeroing target may be illuminated by a visible light source. Optionally, the light source may be positioned behind the reticle. Alternatively, and/or additionally, the light chamber may be positioned in front of the reticle. Optionally, the light chamber may include, but is not limited to, an LED. The light chamber optionally generates the appropriate light color/s for the various types of gun-sight. In some embodiments, the reticle may be made of stainless steel. Optionally, a grid and/or coordinates may be engraved thereon.

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a schematic view of a system, in accordance with an embodiment of the current invention. For example, gun-sight system 100 may include a user interface 114. For example, the user interface may include a toggle to switch the system between preset modes (for example, an IR mode and a visible light mode). Optionally the system includes a power source 116 connected to a controller 106. In some embodiments, in a visible light mode, the controller 106 may set a focusing assembly 112 into a visible focusing mode (e.g., wherein visible light from a reticle 110 is focused on a sight) and/or designate a visible light source 113 that illuminates the reticle 110 with visible light when system is activated. In some embodiments, in an IR mode, the controller 106 may set a focusing assembly 112 into an IR focusing mode (e.g., wherein IR light from a reticle 110 is focused on a sight) and/or designate a heat sink (e.g., thermal cooler 108, 118) that cools the reticle 110 and/or a reticle when the system is activated so that the reticle will be recognizable against the background in by an IR detector. Alternatively or additionally, the reticle 110 and reticle may be heated in the IR mode.

Optionally, the controller 106 may be connected to a detector (not shown), which may optionally be cooled or uncooled. The controller 106 may be connected to one or more thermal coolers (TAC) 108, 118 and one or more thermistors 102, 104. The controller 106 may activate and/or deactivate the one or more thermal coolers 108, 118 in response to signals from the one or more thermistors 102, 104. The one or more thermistors 102, 104 and/or thermal coolers 108, 118 may optionally be connected to a reticle 110 which may be connected to a focusing assembly 112, which may include one or more lenses.

According to some embodiments, the focusing assembly may be composed of a multi-band material, e.g., Zinc Selenide, etc. Optionally, the focusing assembly may include one or more lenses which may be transparent to the thermal radiation with a wavelength between about 7 nm to about 10 nm. Optionally, the focusing assembly may include a switchable and/or adjustable focal length. Alternatively or additionally, lenses of various materials (including materials transparent in only one band) may be removed and/or substituted and/or added in various modes.

Figure 2A:
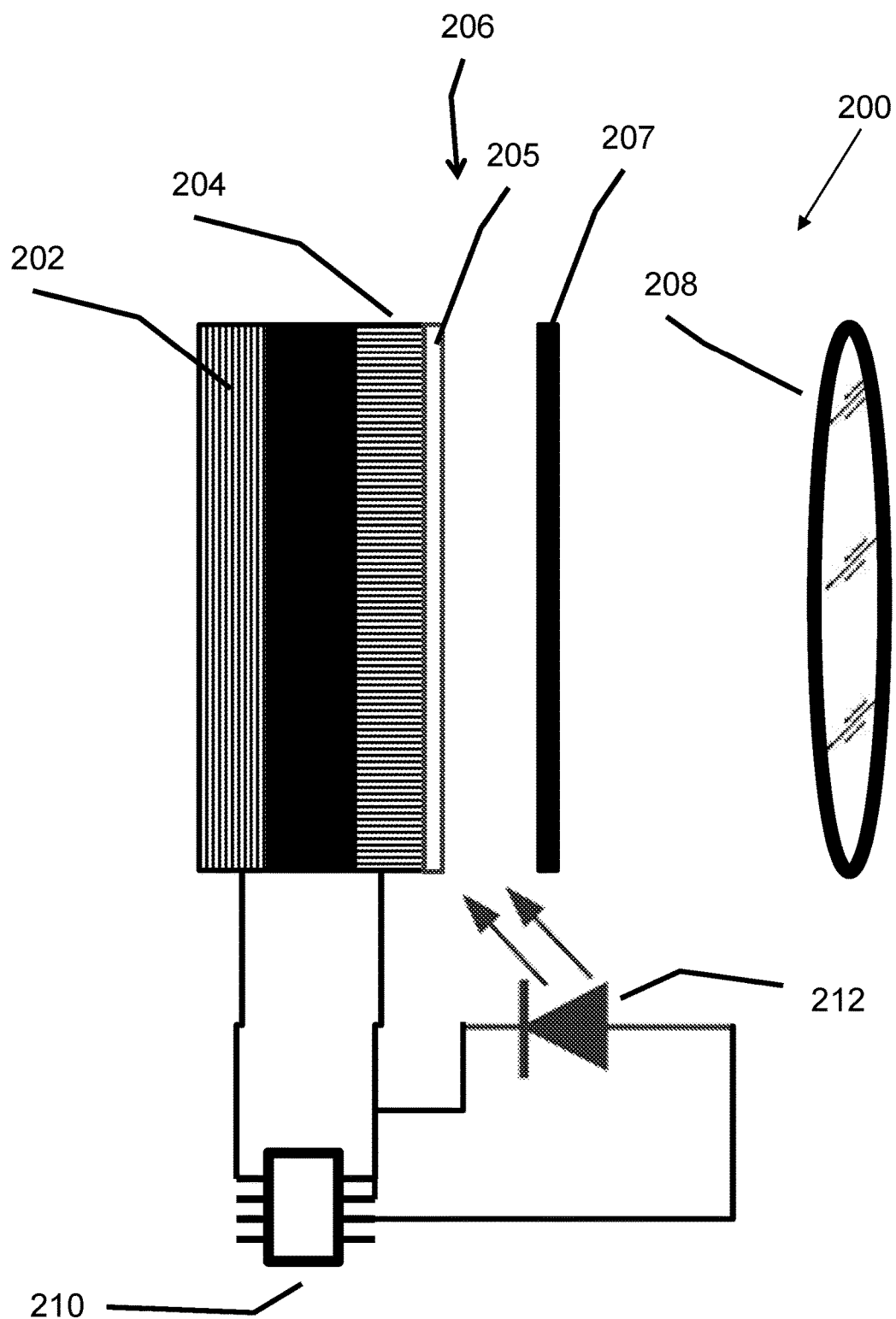
FIGS. 2A and 2B are schematic illustrations of zeroing targets, in accordance with an embodiment of the current invention.
Figure 2B:
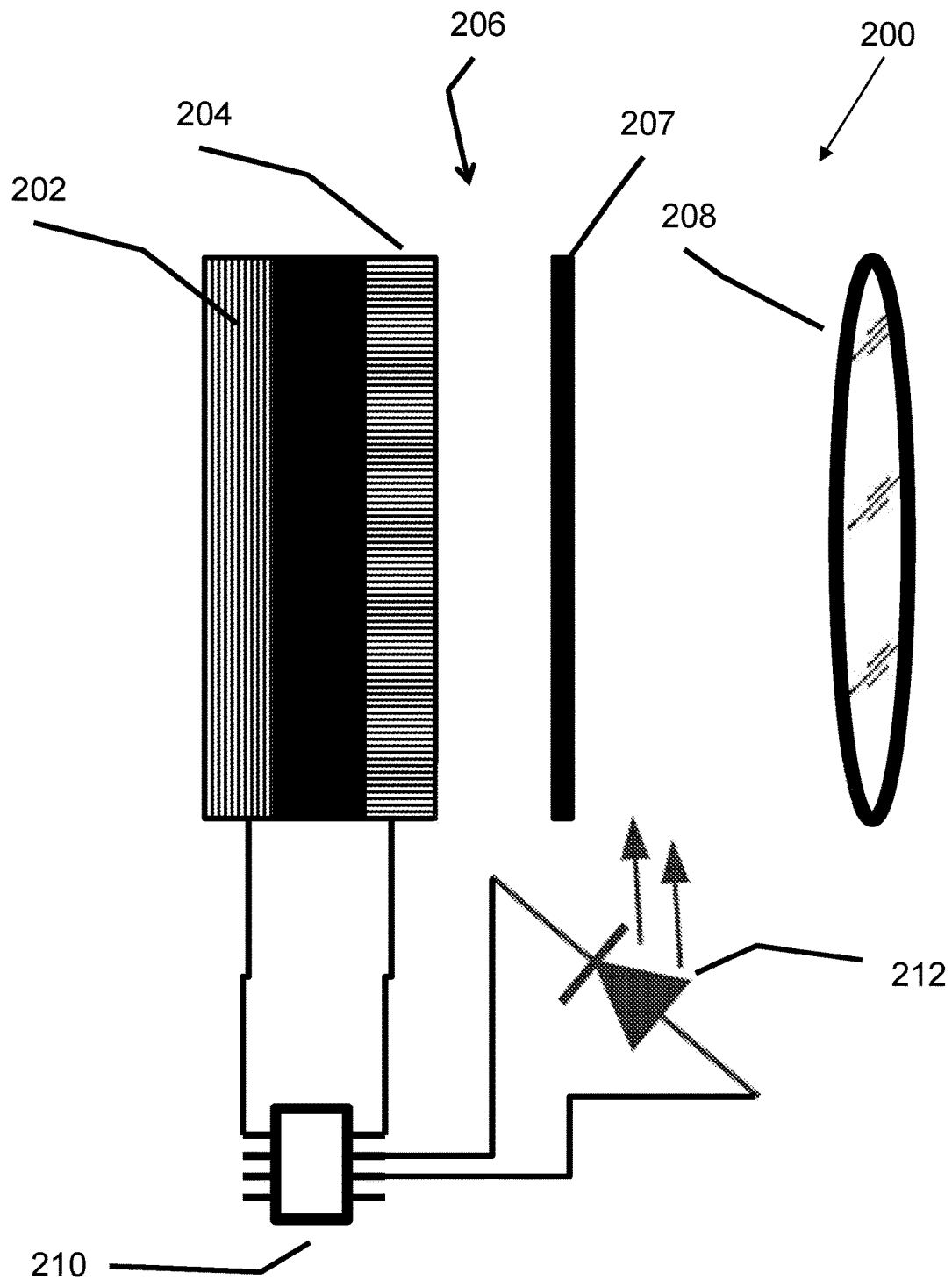

FIGS. 2A and 2B are schematic illustrations of a systems 200 and 201 in accordance with an embodiment of the current invention. For example, system 200 may include a focusing assembly 208 may focus visible and/or infrared (thermal) wavelengths from to one or more targets 206. For example, the target 206 may include one or more reticles 207. For example, the target 206 may include one or more illumination sources. For example, an infrared illumination source may include one or more thermal cooling units (TAC), e.g., having a cold side 204 and/or on a hot side 202. The thermal cooling units may optionally be connected to one or more thermistors (not shown). In some embodiments, a relatively warm reticle may be seen in the infrared with respect to a cool background. For example, the background may be cooled and/or the reticle may be at ambient temperature. For example, the cold side 204 of the TAC may supply a cold background to a relatively warm reticle which is visible in the infrared. Alternatively or additionally, the reticle may be heated. Alternatively or additionally, the reticle may be cooler than the background. For example, the reticle may be cooled and/or the background heated. Optionally, the thermal cooling units may be connected to a controller 210. Optionally, system 200 may include a visible illumination source 212, e.g., an LED for visible illumination, for example, between the focusing assembly 208 and/or a background 205. In some embodiments, the visible illumination source 212 may be located and/or directed between the focusing assembly 208 and the reticle 207, e.g., as in system 201 of FIG. 2B. Alternatively or additionally, the visible illumination source 212 may be located and/or directed between the reticle 207 and a background 205, e.g., as in system 200 of FIG. 2A. For example, the cool side 204 of the TAC may be colored to reflect visible light (e.g., white). In some embodiments, the visible illumination source 212 may be connected to and/or controlled by a controller 210.

According to some embodiments, a single zeroing target may be viewable in multiple bands. Alternatively, and/or additionally, the zeroing target may have switchable operation, e.g., when using for optical sighting the LED may be activated and/or the cooling system may be deactivated. For example, a toggle may designate which illumination source responds to an activation command (e.g., the visible lights source is designated to light when a person activates illumination when the system is in a visible mode and/or the heat source/sink is designated to activate in response to a user activating illumination when the system is in an IR mode. Alternatively, and/or additionally, when using the thermal sighting, the LED may be deactivated and/or the cooling system may be activated. Alternatively, and/or additionally, the system may include multiple zeroing targets for different wave bands.

According to some embodiments, the illumination source may be configured to provide a light box behind the reticle e.g., by creating an illuminate light chamber and/or a different temperature background (cold or hot) and/or a different color background (darker and/or lighter). Optionally, the illumination source may be selected with the appropriate light color temperature.

Figure 3A:
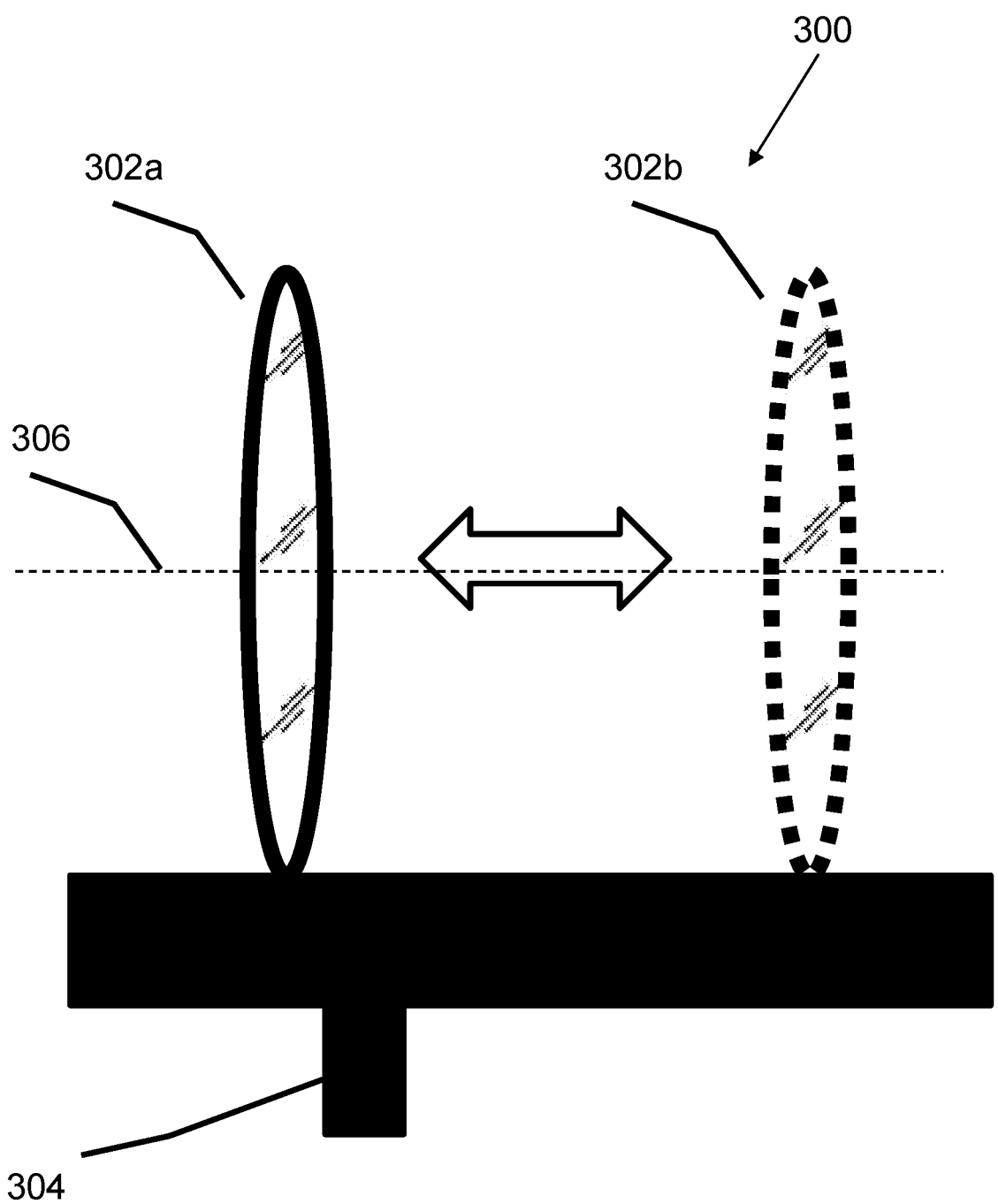
FIGS. 3A and 3B are schematic illustrations of a dual band focusing assembly, in accordance with an embodiment of the current invention.
Figure 3B:
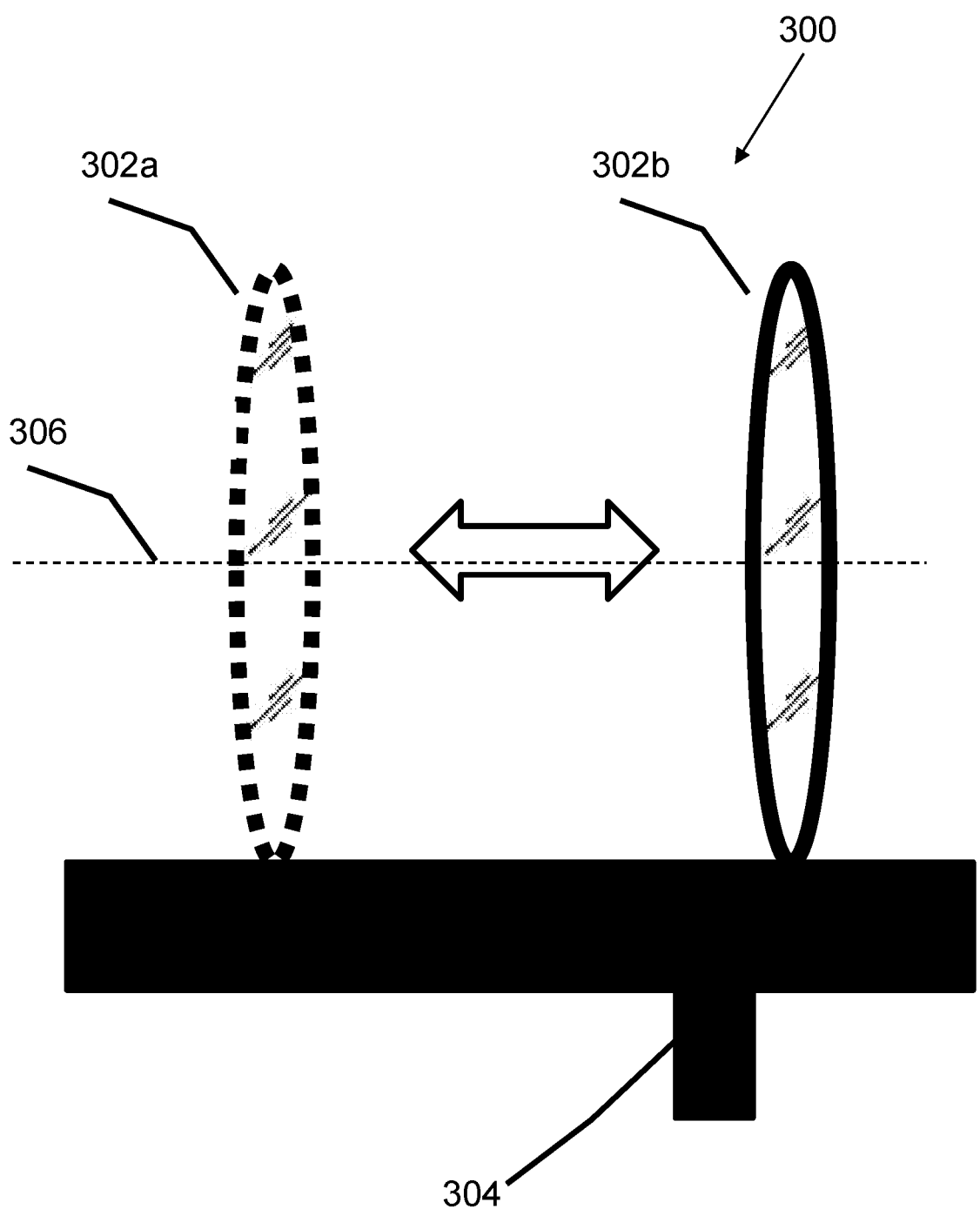

FIGS. 3A and 3B are schematic illustrations of a dual band focusing assembly, in accordance with an embodiment of the current invention. For example, a focusing assembly 300 may reversibly switch between an optical sighting configuration (e.g., FIG. 3A) and a thermal sighting configuration (e.g., FIG. 3B), and vice versa. Focusing assembly 300 may include a switching mechanism 304, which may reversibly move the lens from an optical sighting configuration position 302*a* to a thermal sighting configuration position 302*b*, and vice versa.

In some embodiments, a user may connect the calibration system to a weapon. For example, aligning the target (e.g., the zeroing target) with the barrel of a gun and/or gun-sight. Optionally, the user may set the system to the desired settings for the selected band. For example, the focal length and/or zeroing target may be selected according to the required bandwidth of the sight. Optionally, there may be a toggle mechanism (e.g., a switchover mechanism) to facilitate switching the system between two or more preset settings and/or configurations (e.g., a first configuration for thermal sighting and a second configuration for optical sighting). Optionally, the user may sight the zeroing target and/or read the position of the crosshair on the zeroing target and/or adjust and/or zero the sight according to the reading.

In some embodiments, the focal length of a lens may vary according to various frequencies (e.g., the focal length may differ between the IR and visible spectrums). Optionally, a switch-over mechanism may be used to set the focal length. For example, by moving the lens (e.g., a dual band lens) closer or further from the target along the optical axis 306 of the system. Optionally, the system may include a simple mechanism to switch over the system between fixed states for each frequency band. For example, a switch may move the lens between two configurations, a first configuration where the focal length is suitable for optical sighting, and a second configuration where the focal length is suitable for thermal sighting. For example, the switch may be mechanical and/or electronic and/or electro-mechanical (e.g., with a servo motor). Optionally, to switch between configurations a user may toggle the switch without further adjustment. Optionally, switching between configurations may shift the focusing mechanism. Optionally, switching between configurations may switch the state of the zeroing target. Optionally, switching between configurations may activate and/or deactivate one or more illumination sources and/or one or more cooling units. Alternately or additionally, the position of the target may be changed in different configurations such light from the target is focused onto the sight in the different bands in the different modes. Alternatively or additionally, lenses may be added, subtracted and/or switched when the system switches between modes. For example, an IR lens may be moved to the optical axis 306 in the IR mode and/or moved away from the optical axis in the visible mode. For example, a visible light lens may be moved to the optical axis 306 in the visible mode and/or moved away from the optical axis in the IR mode.

In some embodiments, the dual band target may be at a different temperature from the background (e.g., for thermal sighting) and/or may be illuminated in the visible spectrum (e.g., for optical sighting). In some embodiments, focal length of the focusing assembly may be set by a two-way switching mechanism (e.g., toggle) which may move the lens between two or more configurations.

Figure 4:
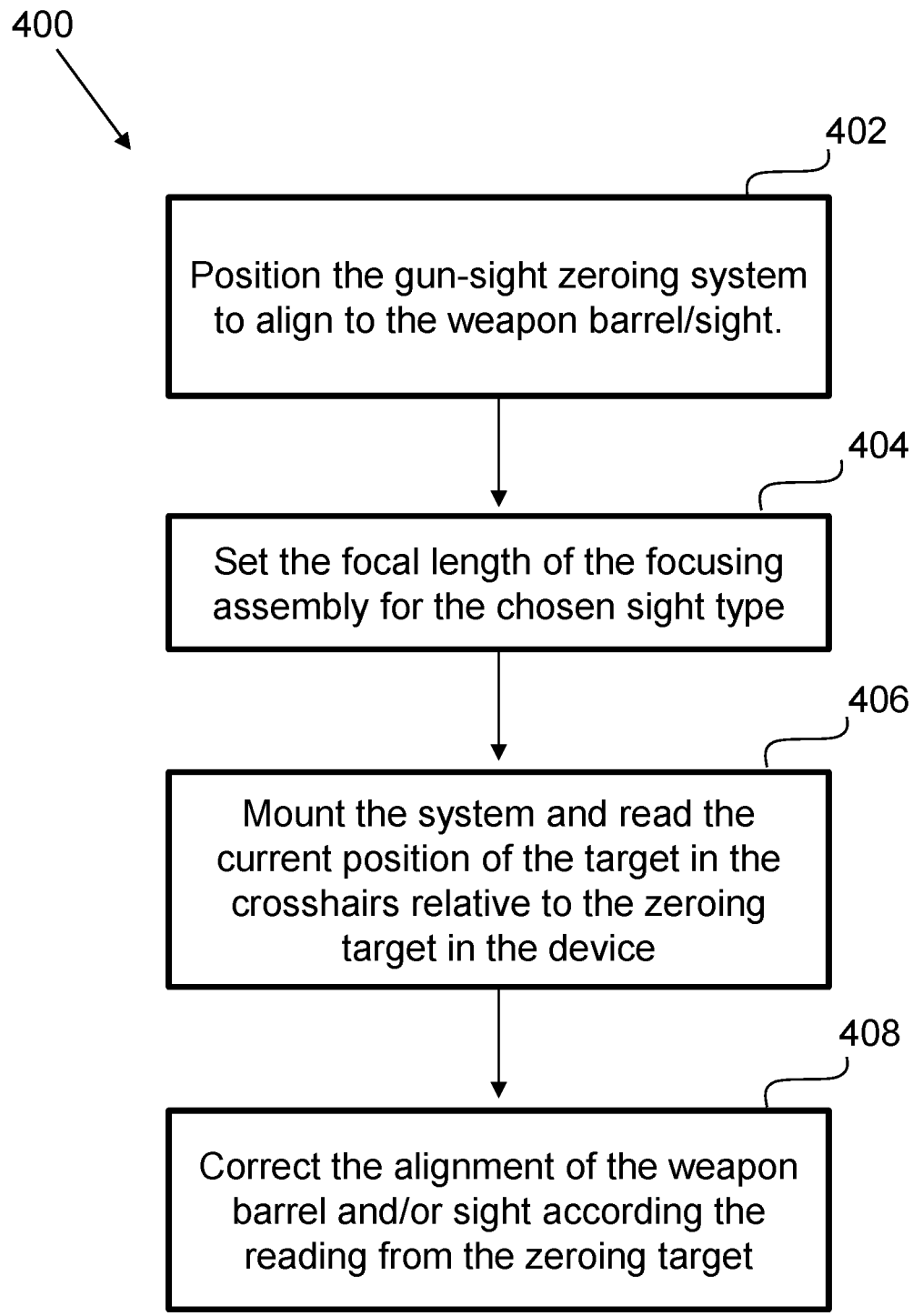
FIG. 4 is a flow chart illustrating calibrating a gun-sight, in accordance with an embodiment of the current invention.

FIG. 4 is a flow chart illustrating calibrating a gun-sight, in accordance with an embodiment of the current invention. For example, in method 400, the gun-sight zeroing system (e.g., dual band target) is positioned 402 aligned to the weapon barrel and/or sight. The focal length of the focusing assembly for the selected sight type (e.g., optical, thermal, etc.) is set 404. For example, lenses made changes and moved to achieve a desired focal length for light in the selected band. For example, a multi-band lens may be positioned in one position for one band and/or a second position for the other band. Optionally, an appropriate illumination system is designated (e.g., to be activated when the illumination is desired) and/or activated. For example, a visible light source may be designated in the visible light mode and/or a heat source/sink may be designated in the IR mode. Optionally, the use scenario of different illumination systems may differ. For example, a visible light source (e.g., and LED) may only be activated momentary at the time of a measurement. For example, a heat source/sink may be activated prior to measurements and/or may be run in a controlled mode (e.g., when the system is in the IR mode a temperature may be maintained (optionally in a stand-by mode) even when a measurement is not being made). The device is optionally mounted on the weapon and the current position of the target in the crosshairs relative to the zeroing target in the device is read 406. Correct the alignment of the weapon barrel and/or sight according the reading from the zeroing target 408.

Figure 5:
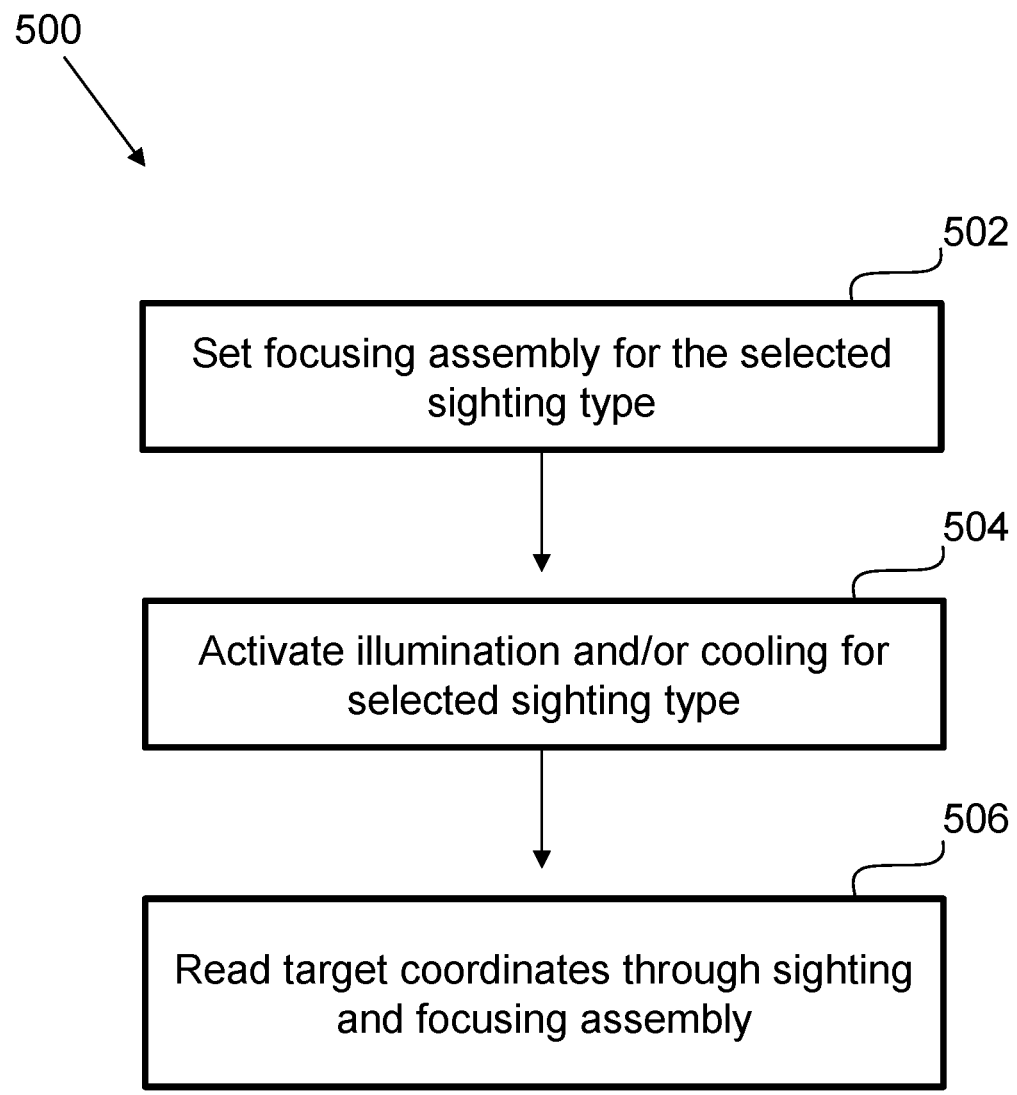
FIG. 5 is a flow chart of a method of gun-sight dry zeroing, in accordance with an embodiment of the current invention.

FIG. 5 is a flow chart of a method of gun-sight dry zeroing, in accordance with an embodiment of the current invention. For example, in method 500, the focusing assembly is set for the selected sighting type (e.g., optical, thermal, etc.) 502. Activate illumination and/or cooling for selected sighting type 504. Optionally, the lighting appropriate illumination system may be activated in a stand-by mode and/or designated for activation when illumination is desired. After setting the bore sighting system for the appropriate sight type, the system is activated. Optionally, with the system activated in the appropriate mode, target coordinates are read through sighting and focusing assembly 506 and/or used to calibrated the sight.

Figure 6:
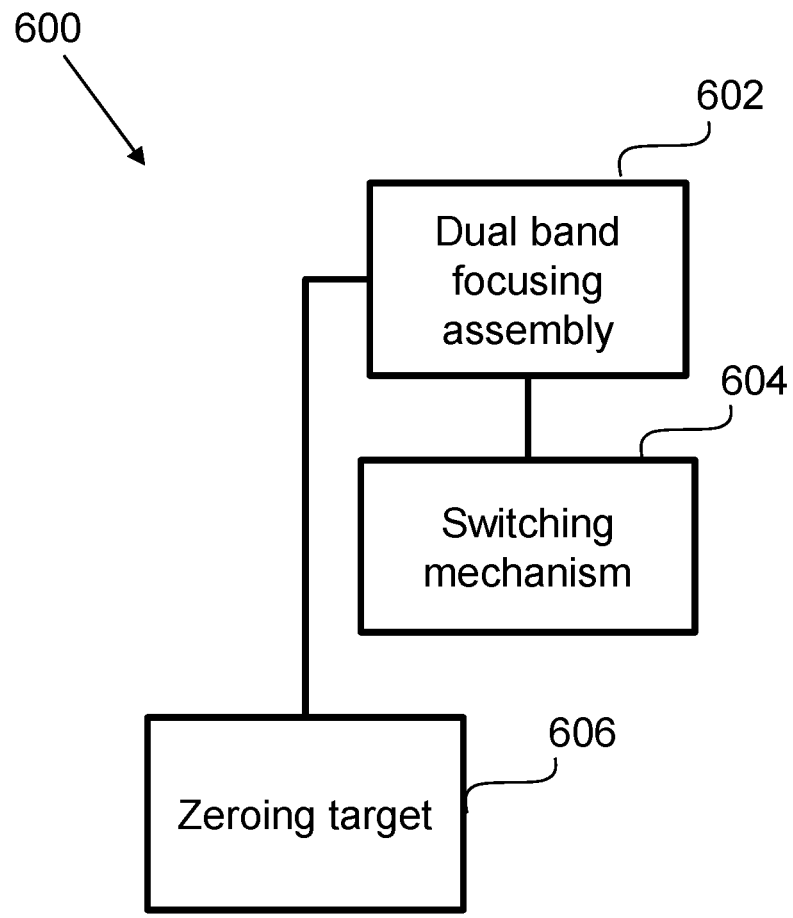
FIG. 6 is a block diagram of a dry gun-sight zeroing system, in accordance with an embodiment of the current invention.

FIG. 6 is a block diagram of a dry gun-sight zeroing system, in accordance with an embodiment of the current invention. For example, in system 600, a dual band focusing assembly 602 is connected to a switching mechanism 604 and a zeroing target 606 and/or an illumination system. For example, when a user toggles the system to a particular mode (e.g., IR and/or visible light) the various subsystems are activated and/or set and/or designated to the appropriate settings. The user then activates the system in the selected mode and/or makes measurements with the appropriate sight.

Figure 7:
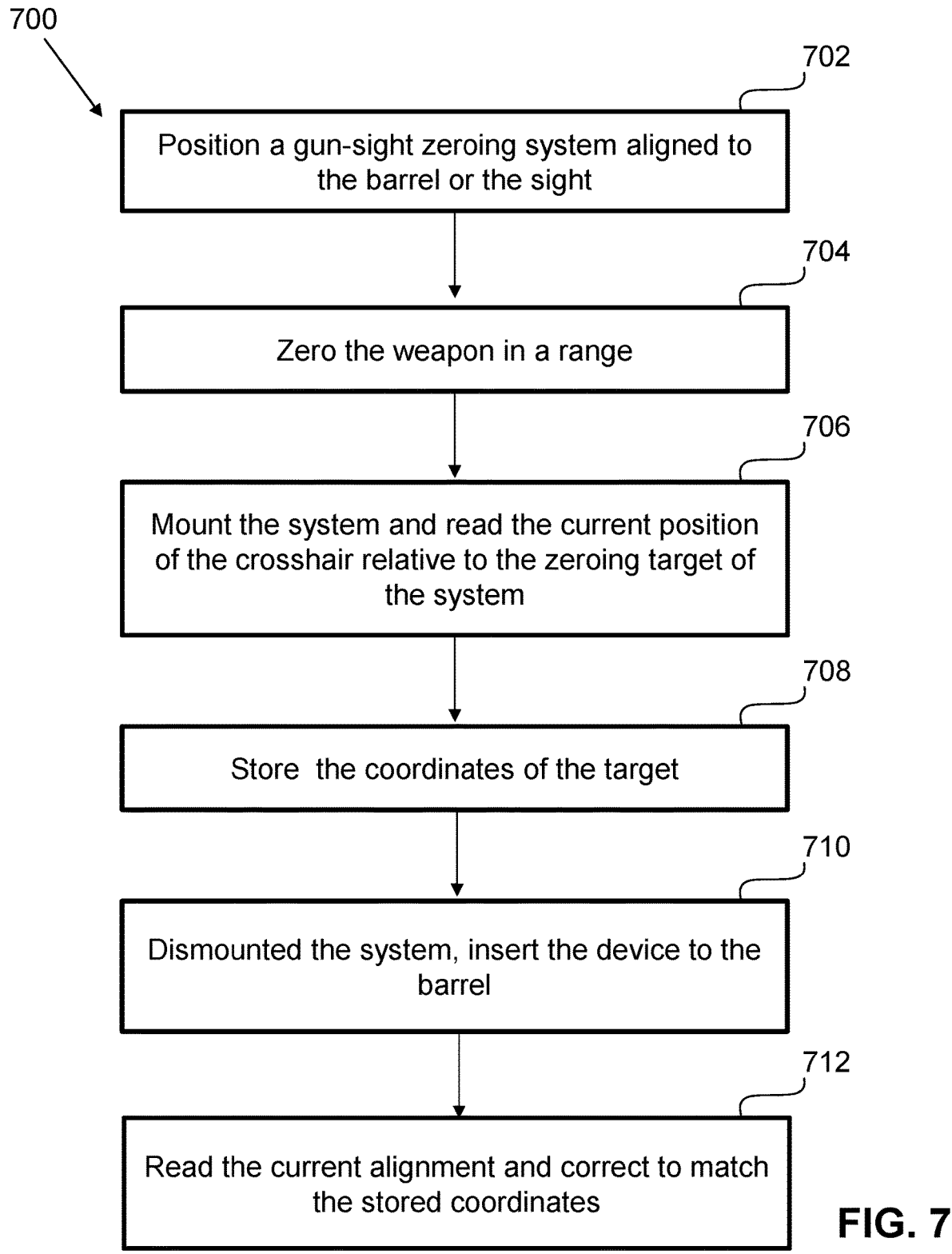
FIG. 7 is a flow chart of a method of gun-sight dry zeroing, in accordance with an embodiment of the current invention.

FIG. 7 is a flow chart of a method of gun-sight dry zeroing in accordance with an embodiment of the current invention. For example, in method 700 position 702 a gun-sight zeroing system aligned to the barrel or the sight, zero 704 the weapon in a range. Mount 706 the system to the weapon and read the current position of the crosshair relative to the zeroing target of the system. Store 708 the coordinates of the target. Dismount 710 the system from the weapon and insert the system to the barrel. Read 712 the current alignment and correct to match the stored coordinates.

In some embodiments, the gun-sight zeroing system may be inserted into the barrel using a rod. In some embodiments, the zeroing target may use IR radiation and/or visible light, etc. In some embodiments, the focal length of the lens in the focusing assembly may be adjusted, for example by moving the lens closer and/or further from the target.

Figure 8:
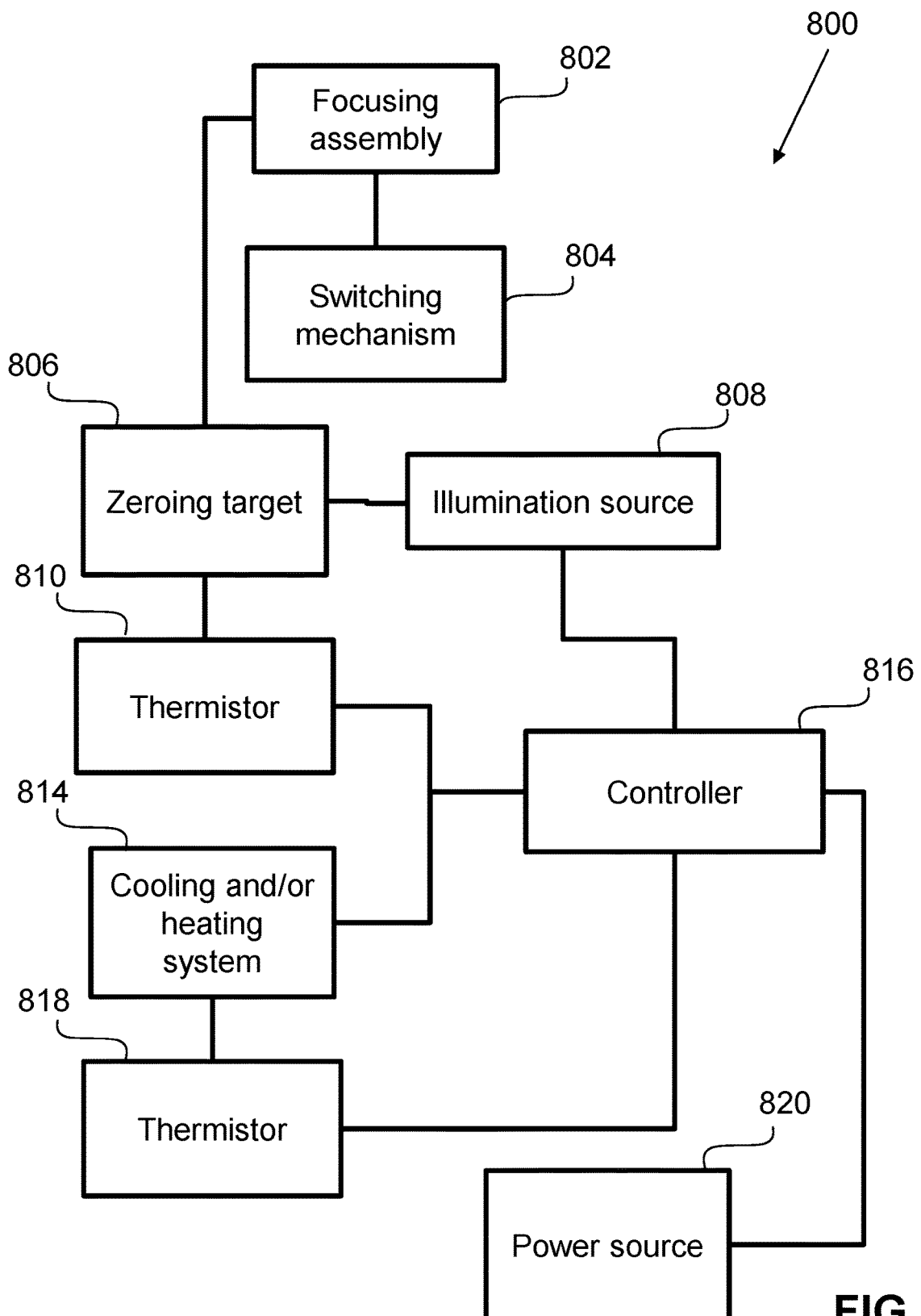
FIG. 8 is a block diagram of a dry gun-sight zeroing system, in accordance with an embodiment of the current invention.

FIG. 8 is a block diagram of a dry gun-sight zeroing system in accordance with an embodiment of the current invention. For example, in system 800, the focusing assembly 802 may include one or more multiband lenses (not shown) and a switching mechanism 804. Optionally, the switching mechanism 804 may be configured to facilitate reversibly switching between two or more configurations, e.g., an optical sighting configuration and a thermal sighting configuration. The focusing assembly 802 may be associated with a zeroing target 806. Optionally, the zeroing target 806 may be connected to one or more thermistors 810, 818 and a cooling/heating system 814. Optionally, the cooling/heating system 814 may be any system which may increase the visibility of a target when using a thermal sighting configuration, e.g., heat source or heat sink, etc. The one or more thermistors 810, 818 and the cooling/heating system 814 may be connected to a controller 816. The controller 816 may activate and/or deactivate the cooling/heating system 814 based on one or more signals from one or more thermistors 810, 818. Optionally, the controller 816 may be connected to an illumination source 808, e.g., visible light source. Optionally, the illumination source 808 may illuminate the zeroing target 806 and/or one or more elements of the focusing assembly 802 and/or an area therebetween e.g., to act as a light chamber. The controller 816 may activate and/or deactivate the illumination source 808, e.g., when moving from one configuration to another configuration. The controller 816 may be connected to a power source 820.

It is expected that during the life of a patent maturing from this application many relevant technologies will be developed, and the scope of the terms are intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A zeroing assembly for a gun-sight comprising:
   a zeroing target; and
   a dual band focusing assembly, wherein the dual band focusing assembly comprises a lens and a switching mechanism configured to reversibly switch the focusing assembly from a first sighting configuration to a second sighting configuration;
   wherein the zeroing target includes a reticle made of a material that is opaque to visible light and a good conductor.

2. The zeroing assembly of claim 1, wherein said first configuration focuses visible light coming from the zeroing target through the gun-sight and said second configuration focuses infrared light coming from the zeroing target through the gun-sight.

3. The zeroing assembly of claim 1, wherein the reticle is made of metal.

4. The zeroing assembly of claim 1, wherein the lens is composed of a material that is transparent both to visible light and to infrared light.

5. The zeroing assembly of claim 4, wherein the lens is composed of Zinc Selenide.

6. The zeroing assembly of claim 1, further comprising a visible light illumination source located between the zeroing target and the dual band focusing assembly.

7. The zeroing assembly of claim 6, wherein the illumination source is controlled by a controller.

8. A zeroing assembly for a gun-sight comprising:
   a zeroing target;
   a dual band focusing assembly, wherein the dual band focusing assembly comprises a lens and a switching mechanism configured to reversibly switch the focusing assembly from a first sighting configuration to a second sighting configuration; and
   a thermal cooler cooling at least one of a reticle and the target.

9. The zeroing assembly of claim 8, wherein said thermal cooler includes a thermoelectric cooler (TEC).

10. The zeroing assembly of claim 8, further comprising a controller, wherein the controller is configured to activate or deactivate the thermal cooler based on a signal from a thermistor.

11. A method for changing a band of an optical system for dual band bore sighting, the method comprising:
   providing a focusing assembly in a first configuration for use in a first band, said focusing assembly in said first configuration focusing light in a first band from a target onto a gun sight; and;
   reversibly switching said focusing assembly from said first configuration to a second configuration wherein said focusing assembly focuses light in a second band from said target onto said gun sight.

12. The method of claim 11, wherein said optical system includes a dual band lens and wherein said reversible switching includes moving said dual band lens from a first position in a to a second position along an optical axis of the optical system.

13. The method of claim 12, wherein said first position and said second position are predetermined.

14. The method of claim 11, wherein the first configuration is an optical sighting configuration and the second configuration is a thermal sighting configuration.

15. The method of claim 11, wherein in the first configuration a first illuminations source in said first band is designated and further comprising a controller designating a second illumination source in said second configuration.

16. The method of claim 15, wherein the controller is configured to synchronize said switching to designating of an illumination source.

17. The method of claim 15, wherein the system includes a first illumination source in said first band and a second illumination source in said second band and further comprising said controller designating said second illumination source in response to said switching.

18. The method of claim 15, wherein the controller is configured to activate or at least one thermal cooler in response to said switching.

19. The method of claim 15, wherein when said system is in said second configuration, said controller is configured to activate a thermal cooler in response to a signal from at least one thermistor.

\* \* \* \* \*